F. I. & B. P. REMY & A. BERGER.
DIFFERENTIALLY GEARED SPEED CHANGING MECHANISM.
APPLICATION FILED DEC. 9, 1912.
1,090,411.
Patented Mar. 17, 1914.
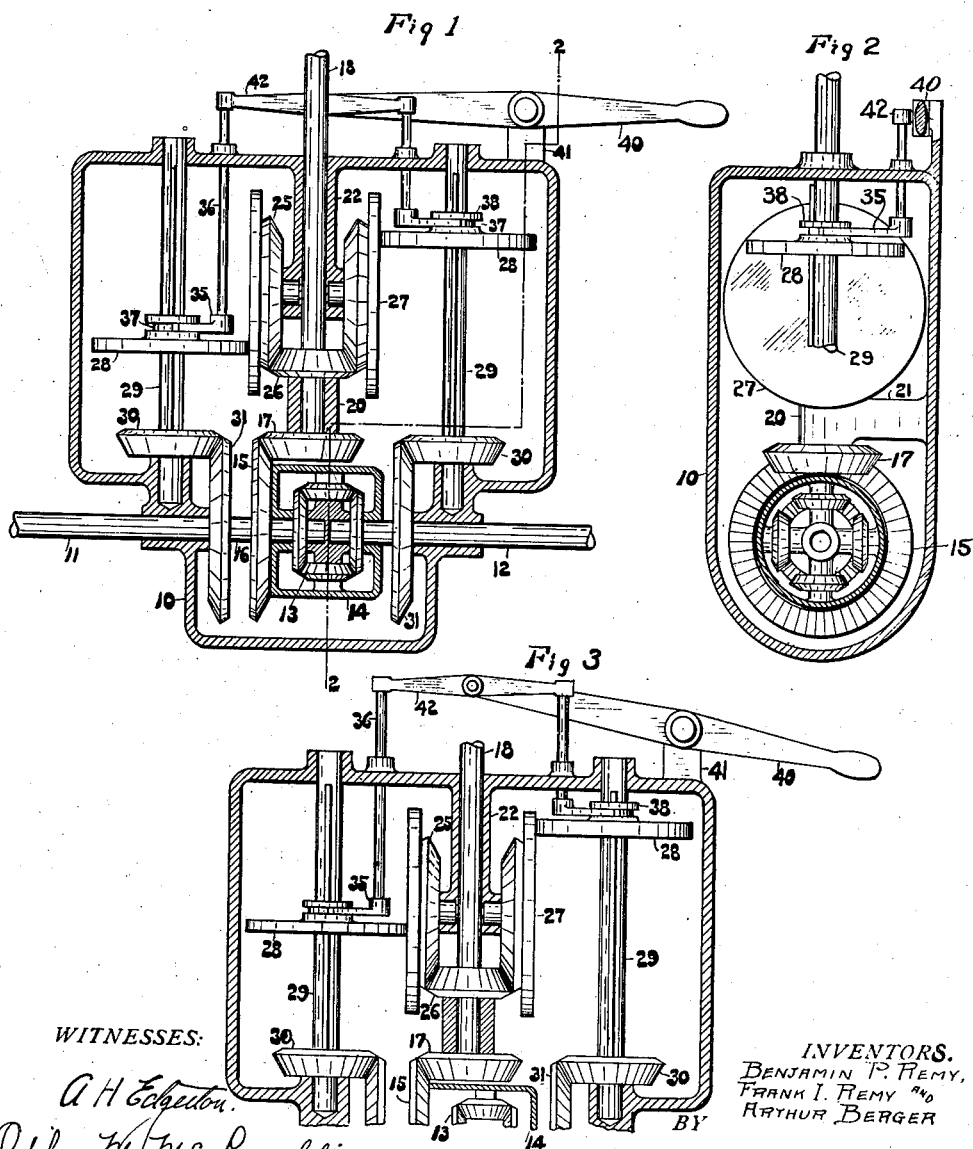
WITNESSES:
INVENTORS.
BENJAMIN P. REMY,
FRANK I. REMY AND
ARTHUR BERGER
BY
ATTORNEY.

UNITED STATES PATENT OFFICE.

FRANK I. REMY, BENJAMIN P. REMY, AND ARTHUR BERGER, OF ANDERSON, INDIANA, ASSIGNORS TO REMY BROTHERS COMPANY, OF ANDERSON, INDIANA, A COPARTNERSHIP.

DIFFERENTIALLY-GEARED SPEED-CHANGING MECHANISM.

1,090,411.

Specification of Letters Patent. Patented Mar. 17, 1914.

Application filed December 9, 1912. Serial No. 735,740.

*To all whom it may concern:*

Be it known that we, FRANK I. REMY, BENJAMIN P. REMY, and ARTHUR BERGER, citizens of the United States, and residents of Anderson, county of Madison, and State of Indiana, have invented a certain new and useful Differentially-Geared Speed-Changing Mechanism; and we do hereby declare that the following is a full, clear, and exact description thereof, reference being had to the accompanying drawings, in which like letters refer to like parts.

The object of this invention is to provide an improved mechanism for driving a pair of shafts, preferably in alinement with each other, so that the speed of the two shafts may be controlled, as desired, that is, may be both driven at the same speed or the speed of either of said shafts increased and the other correspondingly decreased.

The invention has been made with particular reference to means for driving a traction engine, automobile or other power vehicle so as to control the speed of the same when going straight ahead and for turning or steering the same through the drive wheels.

The chief feature of the invention consists in providing constantly running differential gear mechanism at the juncture of the two shafts for actuating the two shafts and also provide additional means for driving each shaft, and means for controlling the speed of said additional means so that the speed of either shaft may be increased and the other correspondingly decreased and the differential will continue to actuate said shafts and take up all of the differentiations in movement or travel of the shafts.

The nature of the invention will be understood from the accompanying drawings and the following description and claims.

In the drawings, Figure 1 is a horizontal central section through the device showing the shafts partially broken away and the mechanism arranged for driving the two shafts at substantially the same speed. Fig. 2 is a vertical section through the same on the line 2—2 of Fig. 1. Fig. 3 is a view similar to Fig. 1, but with the parts altered in position so as to drive the shafts at different speeds, parts being broken away.

There is shown herein a suitable housing or frame 10 in which the power transmitting mechanism is mounted. There are shown two shafts 11 and 12 in alinement with each other, which shafts, in the case of tractors or other vehicles, propel the drive wheels thereof. At the juncture of the shafts there is provided the usual differential gearing 13 in a housing 14 which is rigidly secured to a gear 15 which is mounted loosely by a hub 16 on the shaft 11 and is driven by a beveled gear 17 on the driving shaft 18 which is actuated by the engine, not shown. Therefore, the differential gearing is constantly running at the same speed.

The foregoing mechanism may be constructed and arranged in any desired manner. For the purpose of changing the speeds of the shafts or, if desired, providing an additional coöperative driving means therefor, there is shown herein a pair of gears 25 mounted on the opposite sides of the shaft 18 in a bearing 22 in position to be simultaneously engaged and driven in opposite directions by a beveled gear 26 secured on said shaft 18. To the outside surface of each gear 25 there is secured a friction disk 27 which meshes with another friction disk 28 arranged at right angles thereto and slidably mounted and splined on a shaft 29 mounted in the frame. And each of the shafts 29 has a beveled gear 30 secured thereto which drives a gear 31 secured on one of the shafts 11 and 12. There is a gear 31 on each of said shafts.

The driven friction disks 28 are slidable on the shafts 29 by the arms 35 and a sliding rod 36. The arm 35 projects into a groove 37 on the hub 38 of the driven friction disk 28, and the rods 36 are reciprocated by a lever 40 fulcrumed to the frame between its ends on a bracket 41 and at its inner pivot connected with a frame or pair of arms 42 which are secured to the outer ends of the shifting rods 36. One of the rods 36 is longer than the other so that the friction disks 28 will always be maintained thereby on opposite sides of the centers of the driving friction disks 27.

When the driven friction disks 28 are adjusted to positions equidistant from the centers of the driving disk 27, as shown in Fig. 1, they will drive the shafts 11 and 12 at the same speed. But if the outer end of the lever 40 is moved inward, it will cause the right-hand disk 28 to move away from the center of its driving disk 27 and thereby the speeds of the shafts 11 and 12 will be varied, the shaft 12 operating faster than the shaft 11. If, however, the lever 40 be moved outward and the disk 28 be shifted in the other direction, the shaft 11 will be driven faster than the shaft 12. By proper operation of the lever 40, therefore, any desired difference in the speeds of the shafts 11 and 12 may be obtained, and the differential will take up the inequalities of the operation of the shafts and will coöperate with the other driving power transmitting mechanism in driving the shafts.

We claim as our invention:

1. A pair of shafts in alinement, a differential gear mechanism for driving the same, and additional means for frictionally driving each of said shafts arranged so as to vary the speeds of the shafts.

2. A pair of shafts in alinement, constantly driven differential gear mechanism for actuating the same, and additional means for frictionally driving each of said shafts arranged so as to vary the speeds of the shafts.

3. A pair of shafts in alinement with each other, differential gear mechanism for driving the same, additional means for frictionally driving each shaft, and means for controlling the said additional driving means so as to vary the speeds of said shafts.

4. A pair of shafts in alinement with each other, differential gear mechanism for driving the same, additional means for frictionally driving each shaft, a single means for actuating all of said shaft driving means and means for controlling said additional shaft driving means so as to vary the speeds of said shafts.

5. A frame, a pair of main driving shafts mounted in alinement with each other, a driving shaft, a differential gearing actuated by the driving shaft for driving said driven shafts, a pair of friction disks driven by said driving shaft, a driven friction disk driven by and operated at right angles to each driving friction disk, a shaft on which each driven friction disk is slidably mounted, means for transmitting power from each friction driven shaft to one of said main driven shafts, and means for simultaneously moving said friction disks toward or from the centers of their respective driving friction disks.

6. A frame, a pair of main driven shafts mounted in alinement with each other, a driving shaft, a differential gearing actuated by the driving shaft for driving said driven shafts, a pair of friction disks driven by said driving shaft, a driven friction disk driven by and operated at right angles to each driving friction disk, a shaft on which each driven friction disk is slidably mounted, means for transmitting power from each friction driven shaft to one of said main driven shafts, means for holding the friction driven shafts on opposite sides of the centers of their respective driving friction disks, and means for moving the driven friction disks so as to move them simultaneously toward or away from the centers of their respective driving friction disks.

In witness whereof, we have hereunto affixed our signatures in the presence of the witnesses herein named.

FRANK I. REMY.
BENJAMIN P. REMY.
ARTHUR BERGER.

Witnesses:
H. B. POLAND,
RUTH I. MILLER.